(12) United States Patent
Nishimura

(10) Patent No.: US 11,339,876 B2
(45) Date of Patent: May 24, 2022

(54) BUTTERFLY VALVE

(71) Applicant: CKD CORPORATION, Komaki (JP)

(72) Inventor: Yasunori Nishimura, Komaki (JP)

(73) Assignee: CKD CORPORATION, Komaki (JP)

( * ) Notice: Subject to any disclaimer, the term of this patent is extended or adjusted under 35 U.S.C. 154(b) by 0 days.

(21) Appl. No.: 17/144,334

(22) Filed: Jan. 8, 2021

(65) Prior Publication Data

US 2021/0231220 A1  Jul. 29, 2021

(30) Foreign Application Priority Data

Jan. 24, 2020 (JP) .............................. JP2020-009768

(51) Int. Cl.
*F16K 1/226* (2006.01)
*F16K 51/02* (2006.01)

(52) U.S. Cl.
CPC ............ *F16K 1/2265* (2013.01); *F16K 51/02* (2013.01)

(58) Field of Classification Search
CPC .... F16K 1/2028; F16K 1/2035; F16K 1/2078; F16K 1/224; F16K 1/225; F16K 1/2268; F16K 27/0217; F16K 31/041; F16K 41/00; F16K 41/003; F16K 49/002; F16K 49/005; F16K 5/0285; F16K 5/0485; F16K 5/0694; F16K 25/02
See application file for complete search history.

(56) References Cited

U.S. PATENT DOCUMENTS 4,335,885 A * 6/1982 Heshmat ................. F16J 15/42
 277/347
2010/0096574 A1* 4/2010 Son ....................... F16K 1/2268
 251/129.11

FOREIGN PATENT DOCUMENTS

JP 2019-019851 A 2/2019
WO WO-9501526 A1 * 1/1995 ........... F16K 41/003

* cited by examiner

*Primary Examiner* — Hailey K. Do
(74) *Attorney, Agent, or Firm* — Oliff PLC

(57) ABSTRACT

A butterfly valve includes a drive unit and a valve unit that are coupled to each other. The drive unit includes a hollow part in which a rod is inserted between a DD motor and an end portion of the drive unit on a coupling side to the valve unit. In the hollow part, a cylindrical magnetic member is placed coaxially with the rod to cover the outer peripheral surface of the rod. A magnetic fluid is filled in a void between the outer peripheral surface of the magnetic member and the inner peripheral surface of the hollow part. The rod is made of a non-magnetic corrosion-resistant alloy.

8 Claims, 6 Drawing Sheets

BUTTERFLY VALVE

CROSS-REFERENCE TO RELATED APPLICATIONS

This application is based upon and claims the benefit of priority from the prior Japanese Patent Application No. 2020-009768 filed on Jan. 24, 2020, the entire contents of which are incorporated herein by reference.

BACKGROUND

Technical Field

The present disclosure related to a butterfly valve placed on a pipe connecting a vacuum chamber and a vacuum pump to control the vacuum pressure in the vacuum chamber, the butterfly valve including a drive unit provided with a motor and a valve unit internally provided with a flow passage and a butterfly valve element, in which the drive unit and the valve unit are connected to each other, a rod connected to the motor extends from the drive unit into the flow passage through an insertion through hole of the valve unit, and is connected to the butterfly valve element.

Related Art

In a semiconductor manufacturing process, conventionally, a butterfly valve having a large conductance of a flow passage and serving as a vacuum pressure control device is placed in many cases between a vacuum chamber and a vacuum pump to control the vacuum pressure in the vacuum chamber. For example, the butterfly valve used therein is configured, as disclosed in Japanese unexamined patent application publication No. 2019-19851, such that a drive unit provided with a motor and a valve unit internally provided with a flow passage and a butterfly valve element are connected to each other, a rod connected to the motor extends from the drive unit into the flow passage through an insertion through hole of the valve unit, and is connected to the butterfly valve element.

SUMMARY

Technical Problems

However, the above-mentioned art would cause the following problems. In recent years, the manufacturing cycle of semiconductors has been speeded up by the atomic layer deposition (ALD) method or the like and accordingly the butterfly valve is required to have high durability enough to enable the rod to rotate several ten million times. In conventional butterfly valves, an O-ring is arranged on the outer peripheral surface of the rod to prevent a control fluid (process gas) to flow from a flow passage to the outside of the butterfly valve through the insertion through hole through which the rod extends, thereby sealing the insertion through hole. However, the O-ring does not have durability enough to withstand several ten million rotations. Due to insufficient durability of the O-ring, sealing against the rotation of the rod may become imperfect in a short period and thus a process gas may flow out from the butterfly valve, leading to contamination of the outside air. Further, if the sealing deteriorates in a short period, the butterfly valve has to be replaced with a new one in a short period, which may lower the semiconductor manufacturing efficiency.

The present disclosure has been made to address the above problems and has a purpose to provide a butterfly valve with a long operational life and enhanced durability against the rotation of a rod to prevent outside air contamination due to outside leakage of process gas and improve the operating life.

Means of Solving the Problems

To achieve the above-mentioned purpose, one aspect of the present disclosure provides a butterfly valve to be placed on a pipe connecting a vacuum chamber and a vacuum pump to control vacuum pressure in the vacuum chamber, the butterfly valve including: a drive unit provided with a motor; a valve unit connected to the drive unit and internally provided with a flow passage and a butterfly valve element; and a rod connected to the motor, the rod extending from the drive unit into the flow passage through an insertion through hole of the valve unit and being connected to the butterfly valve element, wherein the drive unit includes: an end portion connected to the valve unit; a hollow part between the motor and the end portion so that the rod is inserted through the hollow part; a cylindrical magnetic member placed in the hollow part so that the magnetic member is coaxial with the rod and covers an outer peripheral surface of the rod; and a magnetic fluid filled in a void between an outer peripheral surface of the magnetic member and an inner peripheral surface of the hollow part, and the rod is made of non-magnetic corrosion-resistant alloy.

According to the above-described butterfly valve, the drive unit includes the hollow part between the motor and the end portion of the drive unit on the side connected to the valve unit so that the rod is inserted through the hollow part, the cylindrical magnetic member placed in the hollow part so that the magnetic member is coaxial with the rod and covers the outer peripheral surface of the rod, and the magnetic fluid filled in the void between the outer peripheral surface of the magnetic member and the inner peripheral surface of the hollow part. In the hollow part, accordingly, the magnetic fluid is held by the magnetic force of the magnetic member, forming a so-called magnetic fluid seal. This magnetic fluid seal is less likely to deteriorate even if the rod rotates several ten million rotations and provides highly durable sealing against the rotations of the rod as compared with an O ring. Further, the process gas that attempts to flow from the flow passage 30 to the outside of the butterfly valve 1 through the insertion through hole is blocked from outflowing by the magnetic fluid seal. The butterfly valve configured as above can prevent the process gas from flowing out from the butterfly valve and thus prevent contamination of outside air while enhancing the durability of the seal. This can also prevent shortening of the operation life of the butterfly valve and hence avoid deteriorating of the semiconductor manufacturing efficiency.

The use of the magnetic fluid may cause the following new issues. To hold the magnetic fluid on the outer periphery of the rod, for example, it is conceivable to use a rod made of magnetic stainless steel. However, the magnetic stainless steel is inferior in corrosion resistance to non-magnetic stainless steel. The rod is a gas-exposed member which is inserted in the flow passage and exposed to process gas. Thus, if the rod is made of magnetic stainless steel, the rod is likely to corrode by the process gas.

In the present disclosure, therefore, the rod made of non-magnetic corrosion-resistant alloy is used to prevent corrosion of the rod. Accordingly, the magnetic member having a cylindrical shape that covers the outer peripheral surface of the rod is used to hold the magnetic fluid.

Advantageous Effects

The butterfly valve in the present disclosure, configured as above, can enhance the durability of sealing against the rotation of the rod, thereby preventing contamination of outside air due to outside leakage of process gas and also achieving a long operational life.

DETAILED DESCRIPTION OF THE EXEMPLARY EMBODIMENTS

A detailed description of an embodiment of a butterfly valve of this disclosure will now be given referring to the accompanying drawings.

Figure 1:
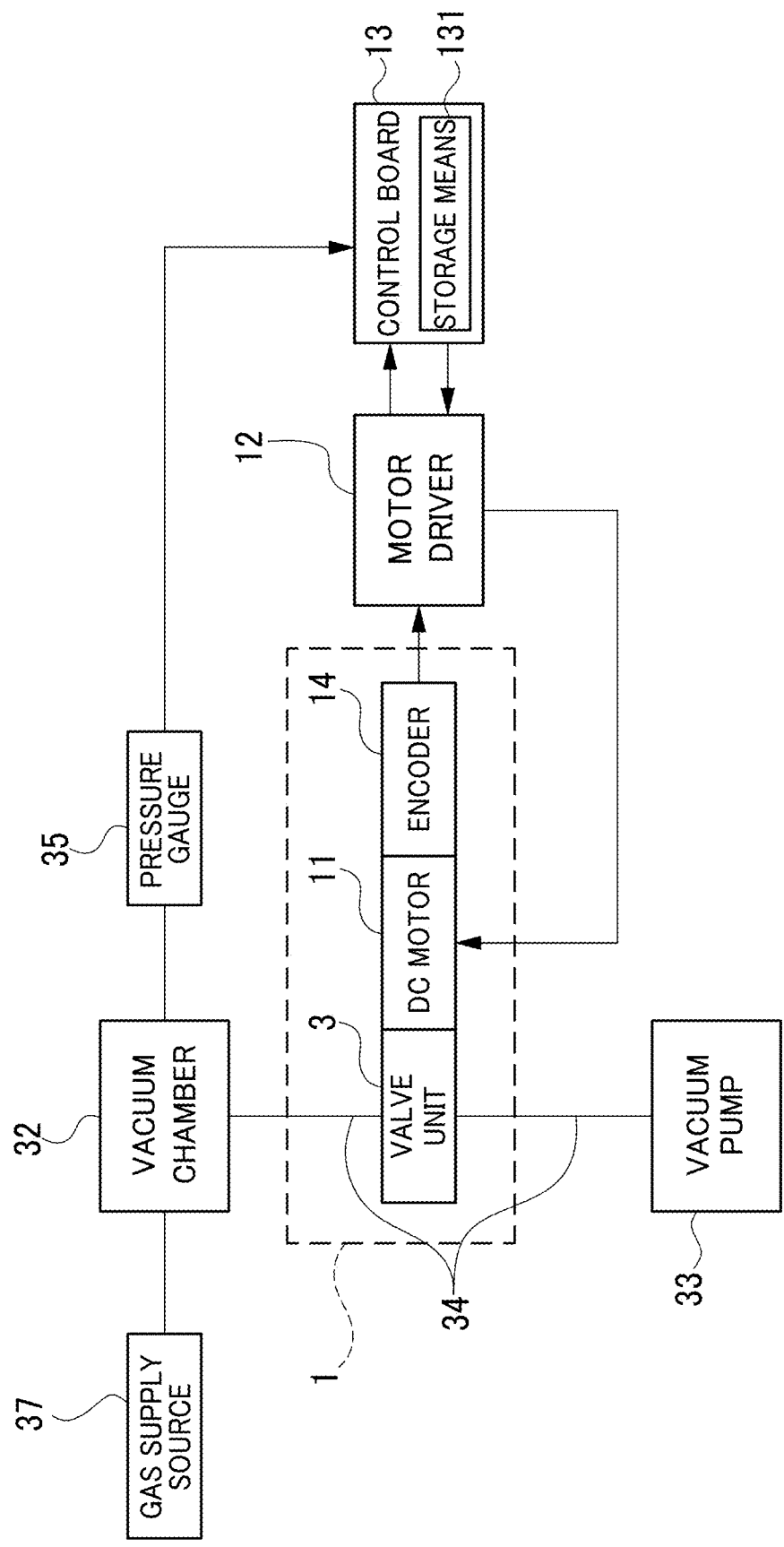
FIG. 1 is a schematic diagram of a vacuum pressure control system using a butterfly valve in an embodiment of the present disclosure.

In a semiconductor manufacturing process, as shown in FIG. 1, a butterfly valve 1 in the present embodiment is placed on a pipe 34 connecting a vacuum chamber 32 and a vacuum pump 33 and used as a vacuum pressure control device to control the pressure in the vacuum chamber 32 to which gas is supplied from a gas supply source 37.

Figure 2:
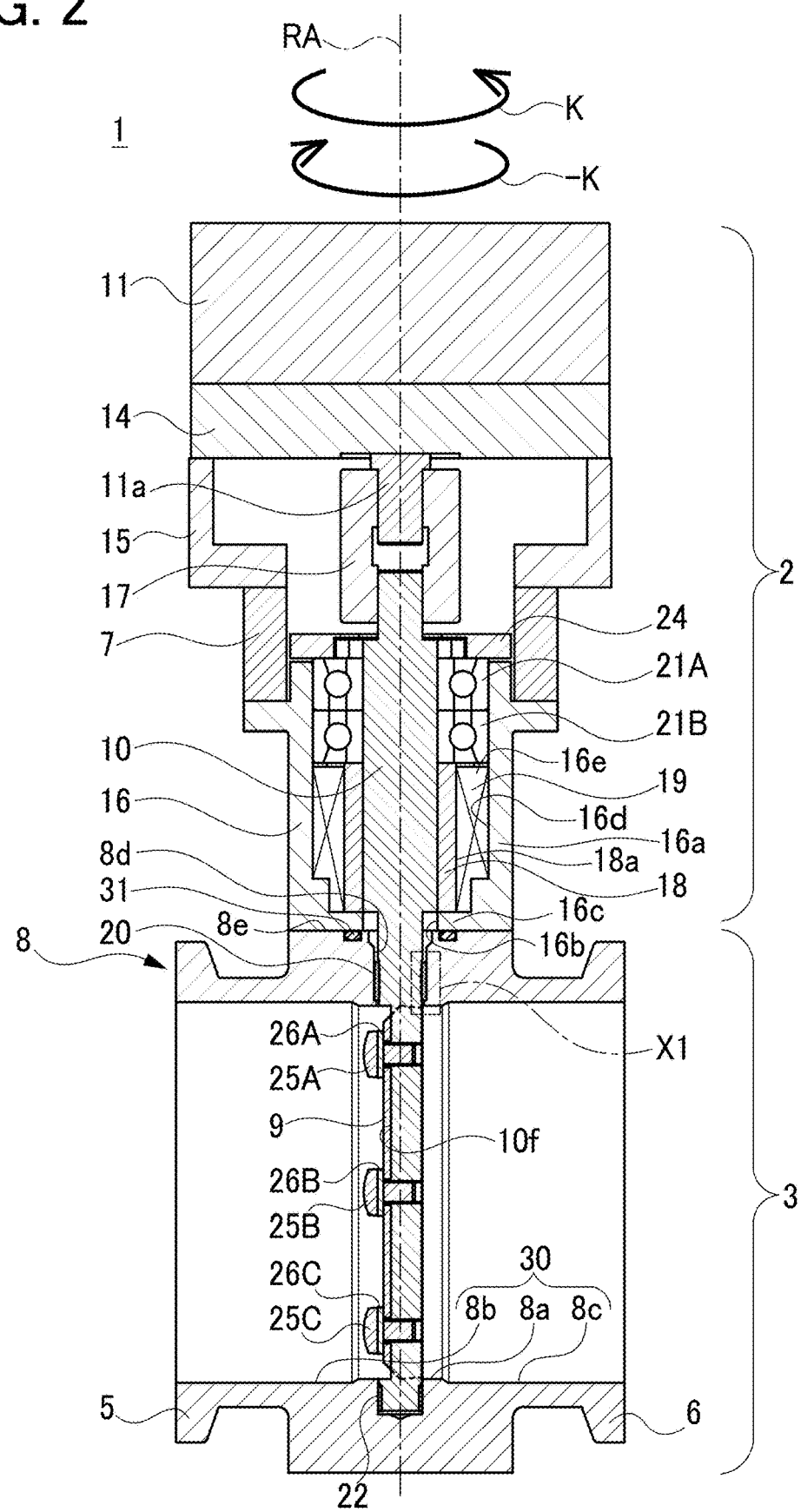
FIG. 2 is a cross-sectional view of the butterfly valve in the embodiment, taken in parallel to the axis of a rotary shaft and parallel to a flow passage.
Figure 3:
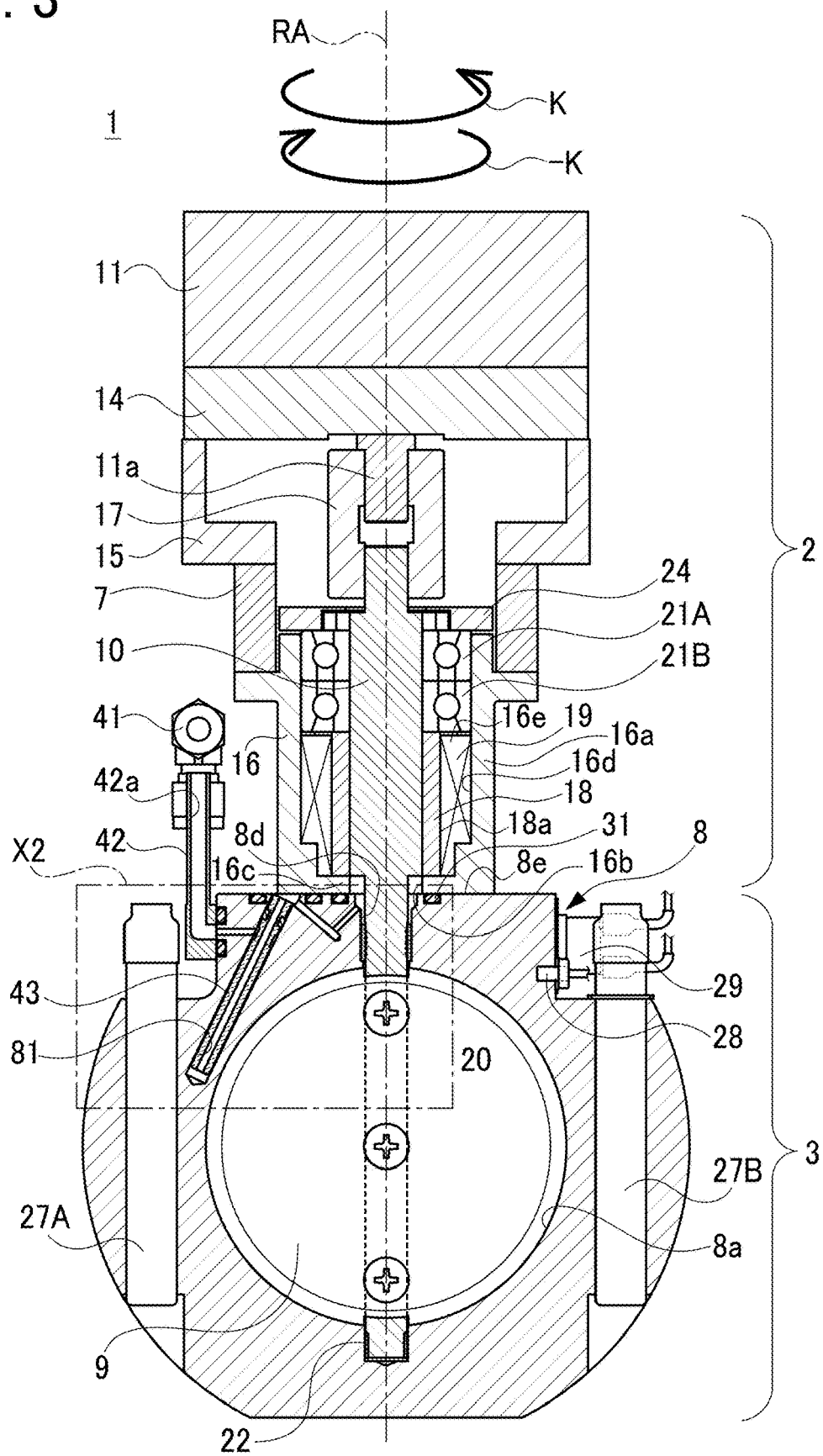
FIG. 3 is a cross-sectional view of the butterfly valve in the embodiment, taken in parallel to the axis of the rotary shaft and perpendicular to the flow passage.

FIG. 2 is a cross-sectional view of the butterfly valve 1 in the present embodiment, taken in parallel to the axis RA of a rotary shaft 11a and in parallel to a flow passage 30. FIG. 3 is a cross-sectional view of the same butterfly valve 1 taken in parallel to the axis RA of the rotatory shaft 11a but perpendicular to the flow passage 30. FIGS. 2 and 3 both show a valve-closed state.

The butterfly valve 1 includes a drive unit 2 and a valve unit 3 as shown in FIGS. 2 and 3. The drive unit 2 includes a direct-drive motor (which will be hereinafter referred to as a "DD motor" and corresponds to one example of a motor of the present disclosure) 11. This drive unit motor 11 is connected to a motor driver 12 and an encoder 14 as shown in FIG. 1. Further, the motor driver 12 is connected to a control board 13. The DD motor 11 has no intermediate mechanism such as a reduction gear or the like. This results in size reduction of the drive unit 2, decrease in noise, and further enhancement of responsivity, speed stability, and positioning accuracy. Thus, the butterfly valve 1 can perform vacuum pressure control with enhanced accuracy. The DD motor 11 includes the rotary shaft 11a whose rotation center is assumed as the axis RA as shown in FIGS. 2 and 3.

The control board 13 is connected to the motor driver 12 and a pressure gauge 35 for detecting the pressure in the vacuum chamber 32 as shown in FIG. 1. This control board 13 includes a storage means 131 that stores for example a fully-closed position and a fully-open position of a butterfly valve element 9 and a rotation angle of the rotary shaft 11a (i.e., a rotation angle of a rod 10 which will be described later) corresponding to an arbitrary target pressure and the like in the vacuum chamber 32. Based on the rotation angle read out from the storage means 131, the motor driver 12 controls the rotation of the DD motor 11.

The rotary shaft 11a is connected to one end (an upper end in FIGS. 2 and 3) of the rod 10 through a coupling 17 formed of a metal plate spring, as shown in FIGS. 2 and 3. Even if the rod 10 is heated by the process gas (e.g., a gas of about) 200° flowing through the flow passage 30, the heat is thus less likely to transfer to the DD motor 11 by the presence of the coupling 17.

The drive unit 2 is connected to the valve unit 3 in such a manner that a housing 16, an insulating member 7, a heatsink 15, and the DD motor 11 are stacked one on top of another. In the drive unit 2, the heatsink 15 and the insulating member 7 are placed between the DD motor 11 and the valve unit 3, thereby enabling to prevent the heat of the valve unit 3 heated by the process gas and heaters 27A and 27B, which will be mentioned later, to transfer to the DD motor 11.

The housing 16 has a cylindrical hollow shape. Accordingly, the drive unit 2 has an end portion 16c (a lower end portion in FIG. 2) connected to the valve unit 3 and includes a hollow part 16a between the DD motor 11 and the end portion 16c. In the hollow part 16a, the rod 10 is inserted and a cylindrical magnetic member 18 is placed coaxially with the rod 10 so that the magnetic member 18 covers the outer peripheral surface of the rod 10. Furthermore, a magnetic fluid 19 is filled in a void 16e between the outer peripheral surface 18a of the magnetic member 18 and the inner peripheral surface 16d of the hollow part 16a. The magnetic fluid 19 is held by the magnetic force of the magnetic member 18, so that a so-called magnetic fluid seal is formed.

An O-ring 31 is placed between the housing 16 and the valve unit 3 to hermetically seal the flow passage 30 and a buffer space 50 mentioned later.

In the drive unit 2, at a position close to the DD motor 11, two ball bearings 21A and 21B are arranged side by side next to the magnetic member 18 and the magnetic fluid 19 in the axial direction of the rod 10. The ball bearings 21A and 21B rotatably support the rod 10. The ball bearings 21A and 21B are fixedly held by a bearing retainer 24 and the magnetic member 18 that are placed above and below.

Further, the housing 16 includes a through hole 16b in the end portion (the lower end portion in FIG. 2) 16c connected to the valve unit 3. The through hole 16b has an inner diameter larger than the outer diameter of the rod 10. The rod 10 inserted in the hollow part 16a extends through the through hole 16b into the valve unit 3.

The valve unit 3 coupled to the drive unit 2 includes a valve body 8 and the butterfly valve element 9. The valve body 8 is made of stainless steel that is resistant to corrosion and heat.

The valve body 8 is provided with a joint 5 on the left and in FIG. 2 and a joint 6 on the right end in FIG. 2. The joint 5 has an inner wall defining an inlet passage 8b and the joint 6 has an inner wall defining an outlet passage 8c. A valve hole 8a is defined by an inner wall having a circular-arc cross-section in FIG. 3 between the inlet passage 8b and the outlet passage 8c. As shown in FIG. 2, the inlet passage 8b, the valve hole 8a, and the outlet passage 8c are provided coaxially and communicated with each other, forming a continuous passage 30. In use, the joint 5 is connected to the vacuum chamber 32 through a pipe 34 and the joint 6 is connected to the vacuum pump 33 through another pipe 34 to release gas (e.g., process gas) from the vacuum chamber 32 through the flow passage 30.

The valve body 8 is provided with a thermocouple 28 serving as a temperature sensor to measure the temperature of the valve body 8 as shown in FIG. 3. The valve body 8 is further provided with a pair of heaters 27A and 27B placed on opposite sides of the valve hole 8a in its diametrical direction in order to keep the temperature of a fluid flowing through the flow passage 30. The heaters 27A and 27B are cartridge heaters and connected to an external controller (not shown) provided outside the butterfly valve 1. These heaters 27A and 27B are controlled by the external controller to turn ON/OFF based on a measurement value of the thermocouple 28 to thereby adjust the temperature of the valve body 8. The valve body 8 further includes a thermostat 29. This thermostat 29 is activated if the heaters 27A and 27B go out of control, excessively heating the valve body 8. When the thermostat 29 starts to operate, the controller stops the heaters 27A and 27B.

The valve body 8 includes an insertion through hole 8d that opens on an end face (an upper end face) 8e connected to the drive unit 2 and extends to the valve hole 8a, as shown in FIGS. 2 and 3. In this insertion through hole 8d, the rod 10 is inserted. The rod 10 inserted through the insertion through hole 8d extends across the valve hole 8a in a direction perpendicular to the flow passage 30. In the insertion through hole 8d, a bush 20 is also placed such that an inner peripheral surface 20a of the bush 20 forms a part of the inner peripheral surface of the insertion through hole 8d. The bush 20 is made of resin that is high in corrosion-resistance and excellent in slidability to enable smooth rotation of the rod 10.

Figure 4:
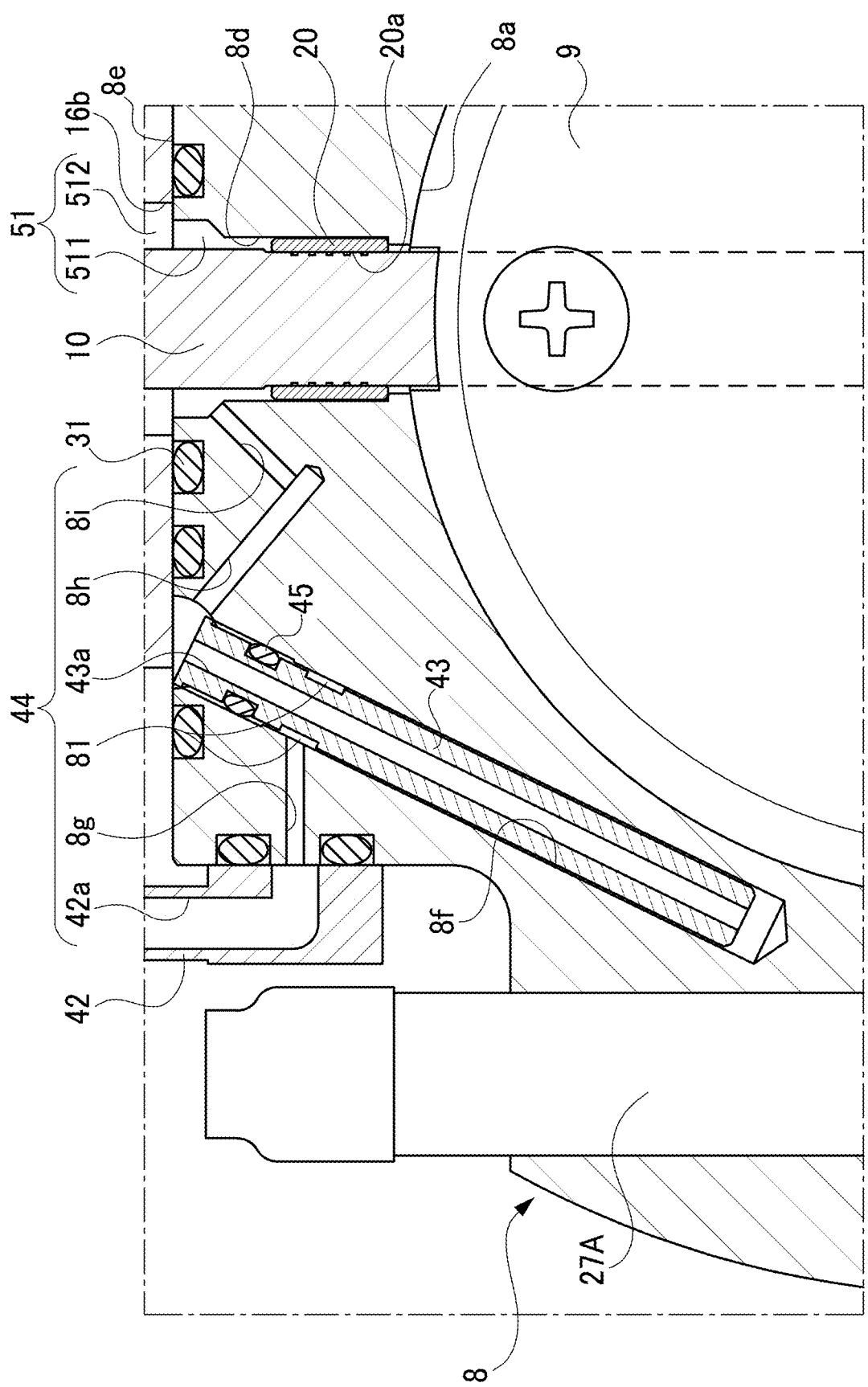
FIG. 4 is an enlarged partial view of a section X2 in FIG. 3.

An upper end portion (namely, a portion that opens on the end face 8e) of the insertion through hole 8d has a larger diameter than another portion in which the bush 20 is placed, so that a first space 511 is formed around the outer peripheral surface of the rod 10 as shown in FIG. 4 which is an enlarged partial view of a section X2 in FIG. 3. In addition, a second space 512 is formed between the inner peripheral surface of the through hole 16b of the housing 16 and the outer peripheral surface of the rod 10. Those first space 511 and second space 512 form a buffer space 51.

Figure 5:
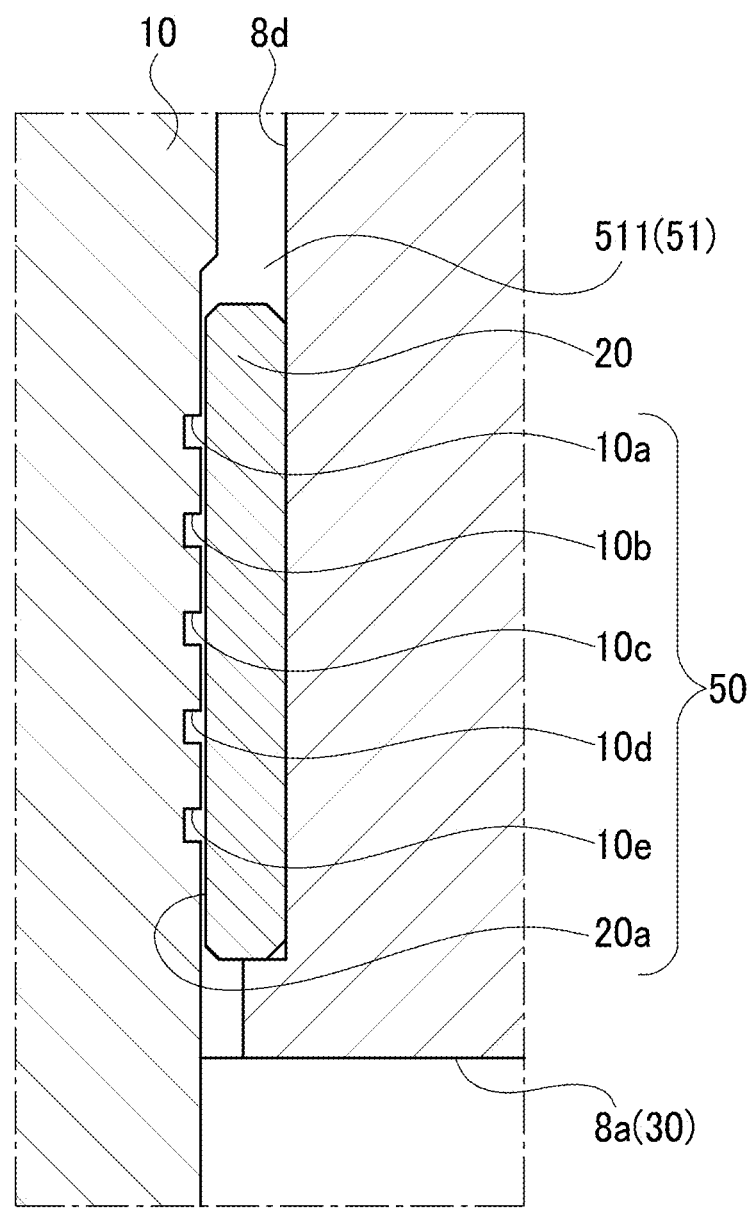
FIG. 5 is an enlarged partial view of a section X1 in FIG. 2.

The rod 10 is made of stainless steel (e.g., SUS316L) which is non-magnetic corrosion-resistant alloy and formed in a columnar shape by machining. The outer peripheral surface of a part of the rod 10 inserted in the insertion through hole 8d is provided with a plurality of recesses 10a to 10e, which are circumferentially extending grooves, arranged in the axial direction of the rod 10 as shown in FIG. 5 which is an enlarged partial view of a section X1 in FIG. 2. The inner peripheral surface of the insertion through hole 8d (i.e., the inner peripheral surface 20a of the bush 20) and the plurality of recesses 10a to 10e form a labyrinth seal 50.

The other end (a lower end in FIGS. 2 and 3) of the rod 10 on a side inserted in the flow passage 30 is rotatably supported by a bush 22 as shown in FIGS. 2 and 3. The bush 22 is made of resin that is high in corrosion resistance and excellent in slidability. As described above, the rod 10 is also rotatably supported by the ball bearings 21A and 21B and thus the rod 10 is rotatably supported with its both ends supported by the ball bearings 21A and 21B and the bush 22. Since the rod 10 is in such a both-end supported state, its rotational central axis is stabilized and less likely to wobble.

The part of the rod 10 on the side inserted in the flow passage 30 is provided with a valve-element mounting part 10f on which the butterfly valve element 9 is fixed. The butterfly valve element 9 is made of stainless steel which is non-magnetic corrosion-resistant alloy and formed in a circular disc shape by machining. The butterfly valve element 9 has an outer diameter approximately equal to the inner diameter of the valve hole 8a. Thus, a gap between the outer periphery of the butterfly valve element 9 and the inner wall of the valve hole 8a is extremely small.

The butterfly valve element 9 is secured to the rod 10 with screws 25A, 25B, and 25C and washers 26A, 26B, and 26C as shown in FIG. 2. These three screws 25A, 25B, and 25C are all the same kind of screws and these three washers 26A, 26B, and 26C are all the same kind of washers.

Since the butterfly valve element 9 is connected to the rod 10, when the rotary shaft 11a of the DD motor 11 rotates in a normal direction K about the axis RA, the rod 10 coupled to the rotary shaft 11a through the coupling 17 is rotated in the normal direction K and accordingly the butterfly valve element 9 is also rotated in the same direction from a position that closes the valve hole 8a. When the rotation angle of the rod 10 reaches 90°, the butterfly valve element 9 comes to a fully-open position to open the flow passage 30, so that a high flow rate of gas is allowed to release from the vacuum chamber 32 through the butterfly valve 1.

When the rotary shaft 11a of the DD motor 11 rotates about the axis RA in a negative direction −K, which is opposite to the direction K for valve opening, by 90° from the fully-open position of the butterfly valve element 9, the rod 10 is also rotated in the −K direction and the butterfly valve element 9 comes to a fully-closed position at which the butterfly valve element 9 closes the valve hole 8a. Even when the butterfly valve element 9 is in the fully-closed position, the valve hole 8a is not completely closed because of the extremely small gap formed between the outer peripheral surface of the butterfly valve element 9 and the inner wall of the valve hole 8a. Thus, the butterfly valve element 9 serves as a so-called restriction. Accordingly, the vacuum chamber 32 is in a state where gas is continuously released therefrom without being stopped. This is because the ALD only needs to control the pressure in the vacuum chamber 32 and does not need perfect sealing of the flow passage 30.

To the valve body 8, as shown in FIG. 3, an inlet port 41 is connected through a purge gas pipe 42 to allow purge gas to flow in the valve body 8.

The valve body 8 is further perforated with an insertion hole 8f for insertion of a heat exchanger 43 which will be described later. This insertion hole 8f extends at an angle to the axis RA from an upper end face of the valve body 8 to near the heater 27A. The insertion hole 8f communicates with a flow passage 42a of the purge gas pipe 42 through a communication hole 8g and also communicates with the insertion through hole 8d through communication holes 8h and 8i.

In the insertion hole 8f, there is inserted the heat exchanger 43 having a cylindrical shape that has a slightly smaller outer diameter than the inner diameter of the insertion hole 8f and internally has a hollow part 43a. Since the heat exchanger 43 has the slightly smaller diameter than the inner diameter of the insertion hole 8f, a clearance 81 is formed between the outer peripheral surface of the heat exchanger 43 and the insertion hole 8f. An O-ring 45 is attached on an end portion of the heat exchanger 43 at a position close to the upper end face of the valve body 8 and compressed by the inner wall of the insertion hole 8f to hermetically close the clearance 81.

The purge gas passage 44 is formed by the above-described passage 42a, the communication hole 8g, the hollow part 43a of the heat exchanger 43, and the communication holes 8*h* and 8*i*. The purge gas passage 44 communicates with the inlet port 41 and the insertion through hole 8*d*. In other words, the purge gas passage 44 and the insertion through hole 8*d* allow communication between the inlet port 41 and the flow passage 30 for flowing process gas, so that the purge gas flowing in the purge gas passage 44 through the inlet port 41 is supplied to the flow passage 30.

To be specific, the purge gas passes through the flow passage 42*a* and the communication hole 8*g* and then reaches the insertion hole 8*f*. At that time, the O-ring 45 prevents the purge gas from flowing toward the upper end face of the valve body 8 and thus the purge gas flows through the clearance 81 toward a lowermost end of the insertion hole 8*f* close to the heater 27A. The purge gas having reached the lowermost end of the insertion hole 8*f* further passes through the hollow part 43*a* of the heat exchanger 43 toward the upper end face of the valve body 8. The heat exchanger 43 has been heated to about 200° by the heater 27A, so that the purge gas is heated in passing through the clearance 81 and the hollow part 43*a*. The purge gas having passed through the hollow part 43*a* and reached the upper end face of the valve body 8 then passes through the communication holes 8*h* and 8*i* and further flows to the insertion through hole 8*d*. The magnetic fluid seal is formed above the insertion through hole 8*d*, thus not allowing the purge gas to flow toward the DD motor 11. The purge gas having reached the insertion through hole 8*d* is therefore outputted to the flow passage 30.

Next, the outline of vacuum pressure control using the butterfly valve 1 will be described below.

The butterfly valve element 9 is configured to, even in the fully-closed position, have an extremely small gap with respect to the inner peripheral surface of the valve hole 8*a* and thus can serve as a restriction. The butterfly valve 1 is therefore operated to continuously release gas from the vacuum chamber 32 in response to operations of the vacuum pump 33. The butterfly valve element 9 is rotated at an arbitrary rotation angle between the fully-closed position (a rotational angle of 0°) and the fully-open position (a rotational angle of 90°) to adjust the passage area (i.e., a valve opening area) of the flow passage 30 so that the pressure in the vacuum chamber 32 becomes a target pressure.

For example, to release a larger amount of gas from when the butterfly valve element 9 is in the fully-closed position or another rotational position at an arbitrary rotational angle to decrease the pressure in the vacuum chamber 32, the control board 13 of the butterfly valve 1 reads a rotational angle corresponding to the target pressure from the storage means 131. Based on this read rotational angle, the motor driver 12 drives the DD motor 11 by use of the encoder 14. The rod 10 is rotated by the DD motor 11 in the normal direction K to the read rotational angle. The butterfly valve element 9 fixed to the rod 10 is also rotated together with the rod 10, thereby increasing the passage area having been reduced.

In contrast, to reduce an amount of gas to be released from when the butterfly valve element 9 is in the fully-open position or another rotational position at an arbitrary rotational angle to raise the pressure in the vacuum chamber 32, the control board 13 of the butterfly valve 1 reads a rotational angle corresponding to the target pressure from the storage means 131. Based on this read rotational angle, the motor driver 12 drives the DD motor 11 by use of the encoder 14. The rod 10 is rotated in the direction −K opposite to the direction for reducing the pressure in the vacuum chamber 32. The butterfly valve element 9 fixed to the rod 10 is also rotated together with the rod 10, thereby reducing the passage area having been increased.

In the above manner, the process gas sucked by the vacuum pump 33 flows through the flow passage 30 whose passage area is adjusted by the butterfly valve element 9. Even if the process gas flowing through the flow passage 30 attempts to enter the drive unit 2 through the insertion through hole 8*d*, the process gas is blocked by the magnetic fluid seal from flowing toward the DD motor 11 because the magnetic fluid 19 held by magnetic force of the magnetic member 18 forms the magnetic fluid seal in the hollow part 16*a* of the housing 16 constituting the drive unit 2. This configuration can prevent the purge gas from flowing out of the butterfly valve 1, leading to contamination of outside air, and avoid shortening of the operation life of the butterfly valve 1 and hence prevent deteriorating of the semiconductor manufacturing efficiency. Further, even when the rod 10 is rotated several ten million times, the magnetic fluid seal is less deteriorated in sealing strength and exhibits very high durability against an increase in the number of rotations of the rod 10.

The purge gas inputted in the vale unit 3 through the inlet port 41 is outputted to the flow passage 30 through the purge gas passage 44 and the insertion through hole 8*d*. Accordingly, the process gas that attempts to flow out of the butterfly valve 1 from the flow passage 30 via the insertion through hole 8*d* is pushed back to the flow passage 30 by the purge gas. Thus, the butterfly valve 1 configured as above can reliably prevent the purge gas from flowing out of the butterfly valve 1 and thus prevent contamination of outside air, and avoid shortening of the operation life of the butterfly valve 1 and deteriorating of the semiconductor manufacturing efficiency.

When flowing in the flow passage 30, the purge gas contacts process gas. Since process gas is solid or liquid at room temperature, it is heated to e.g., about 200° C. in use. At that time, if the temperature of the purge gas is low, the process gas may be solidified or liquefied and consequently product material such as solidified process gas may be accumulated on the inner walls of the flow passage 30 and the pipe 34. In the present embodiment, however, the purge gas is heated to e.g., about 160° C. by the heat exchanger 43 while passing through the purge gas passage 44. Even when contacting the process gas, therefore, the heated purge gas is less likely to solidify or liquefy the process gas.

In the present embodiment, the magnetic fluid 19 is held by the magnetic force of the magnetic member 18. However, if the magnetic fluid 19 is subjected to excessive pressure shock caused by an abrupt pressure change in the vacuum chamber 32, the holding force of the magnetic member 18 could not withstand the pressure shock, resulting in breakage of the magnetic fluid seal. For instance, if an operator erroneously operates the vacuum pump 33, causing the pressure in the vacuum chamber 32 to drastically decrease, a negative pressure is abruptly generated in the flow passage 30. In the drive unit 2, the purge gas is supplied through the inlet port 41. However, if such an abrupt negative pressure occurs in the flow passage 30, the amount of purge gas to be supplied does not catch up. This causes the gas in the drive unit 2 to be steeply sucked into the flow passage 30, resulting in a drastic drop of the pressure in the drive unit 2. In case the pressure in the drive unit 2 drastically lowers, excessive pressure shock is imparted on the magnetic fluid 19, which may break the magnetic fluid seal, making the magnetic fluid seal fail to function. If the magnetic fluid seal is broken, it may be impossible to prevent the process gas from entering the drive unit 2.

The butterfly valve 1 in the present embodiment is however configured such that the inner peripheral surface of the insertion through hole 8*d* (the inner peripheral surface 20*a* of the bush 20) and the plurality of recesses 10*a* to 10*e* provided to the rod 10 form the labyrinth seal 50. Even if a negative pressure abruptly occurs in the flow path 30, the labyrinth seal 50 operates to reduce the amount of gas to be sucked from the inside of the drive unit 2 to the flow passage 30. Thus, the pressure in the drive unit 2 does not drastically decrease and hence the pressure shock to be imparted on the magnetic fluid 19 is reduced. This can prevent breakage of the magnetic fluid seal.

In the present embodiment, the butterfly valve 1 further includes the buffer space 51 between the magnetic fluid 19 and the labyrinth seal 50. Even if a drastic pressure drop occurs in the flow passage 30, the amount of gas to be sucked from the drive unit 2 is larger by the buffer space 51 than in a configuration not including the buffer space 51. The butterfly valve 1 configured as above can reliably reduce the pressure shock to be imparted on the magnetic fluid 19 and also prevent breakage of the magnetic fluid seal.

Figure 6:
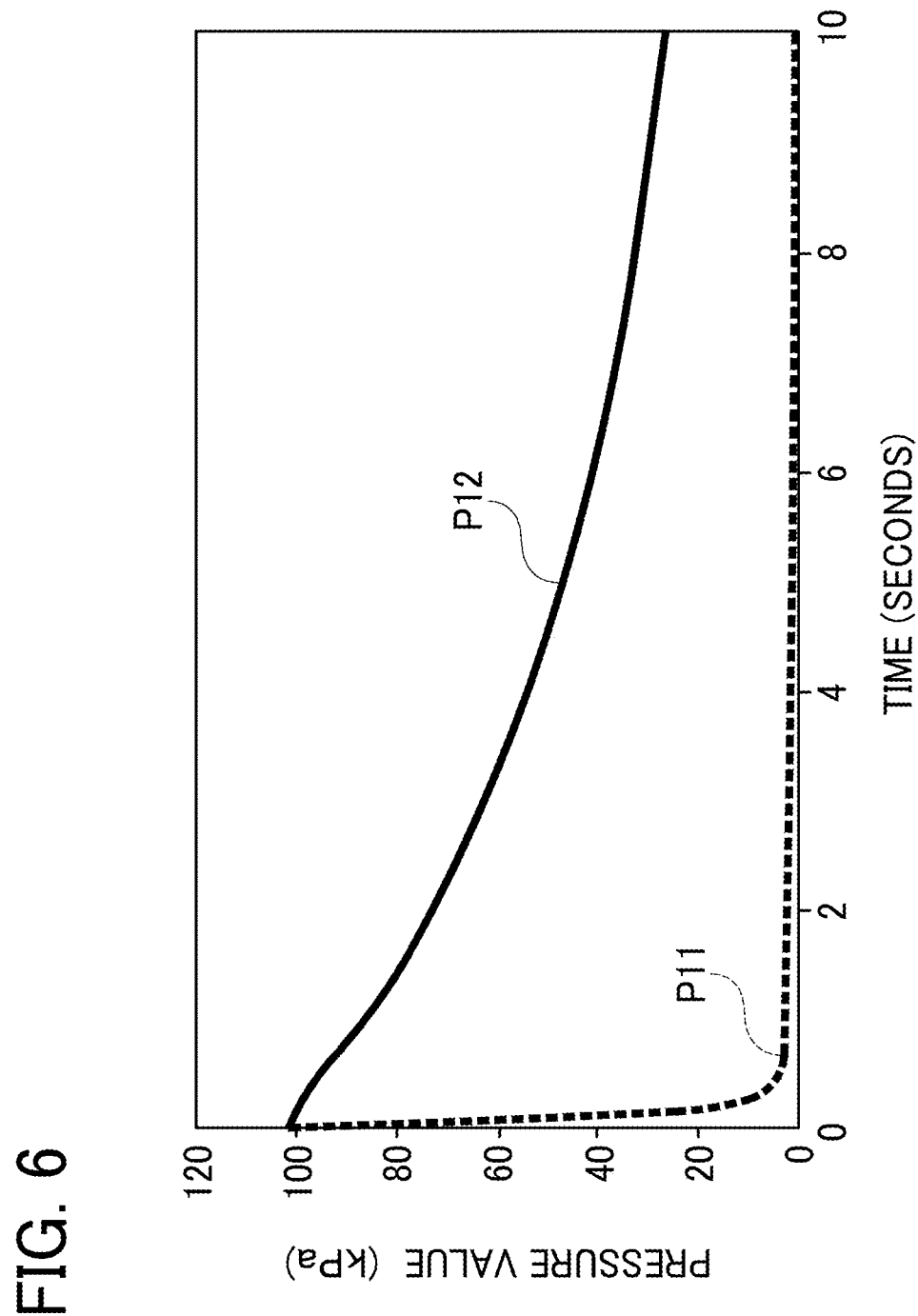
FIG. 6 is a graph showing a relationship between pressure values of pressure in a vacuum chamber and pressure values of pressure applied to a magnetic fluid.

FIG. 6 is a graph showing a relationship between the pressure value P11 of the pressure in the vacuum chamber 32 and the pressure value P12 of the pressure applied to the magnetic fluid 19. In this graph, a vertical axis indicates pressure value (kPa) and a lateral axis indicates time (seconds).

The pressure value P11 of the vacuum chamber 32 drastically decreases from the time of 0 seconds. This represents a state where the pressure in the vacuum chamber 32 has drastically decreased due to for example erroneous operation by an operator. Such a drastic decrease in pressure in the vacuum chamber 32 indicates that a negative pressure abruptly occurs in the flow passage 30 communicating with the vacuum chamber 32. Irrespective of such a drastic pressure change, as is obvious from the graph in FIG. 6, the pressure value P12 applied to the magnetic fluid 19 slowly decreases from the time of 0 seconds. This slow decreasing of the pressure value P12 indicates that pressure shock to be imparted on the magnetic fluid 19 is reduced. This results from that the labyrinth seal 50 reduces the amount of gas to be sucked from the drive unit 2 to the flow passage 30 by the drastic negative pressure generated in the flow passage 30 as described above and also the buffer space 51 serves to increase the amount of gas to be sucked.

According to the butterfly valve 1 in the present embodiment as described above, the following operations and effects are obtained.

(1) The butterfly valve 1 to be placed on the pipe 34 connecting the vacuum chamber 32 and the vacuum pump 33 to control vacuum pressure in the vacuum chamber 32 includes the drive unit 2 provided with the DD motor 11, the valve unit 3 connected to the drive unit 2 and internally provided with the flow passage 30 and the butterfly valve element 9, and the rod 10 connected to the DD motor 11, the rod 10 extending from the drive unit 2 into the flow passage 30 through the insertion through hole 8*d* of the valve unit 3 and being connected to the butterfly valve element 9. In the butterfly valve 1, the drive unit 2 has the end portion 16*c* connected to the valve unit 3 and includes the hollow part 16*a* between the DD motor 11 and the end portion 16*c* so that the rod 10 is inserted through the hollow part 16*a*, the cylindrical magnetic member 18 placed in the hollow part 16*a* so that the magnetic member 18 is coaxial with the rod 10 and covers the outer peripheral surface of the rod 10, and the magnetic fluid 19 filled in the void 16*e* between the outer peripheral surface 18*a* of the magnetic member 18 and the inner peripheral surface 16*d* of the hollow part 16*a*. The rod 10 is made of non-magnetic corrosion-resistant alloy. In the hollow part 16*a*, accordingly, the magnetic fluid 19 is held by the magnetic force of the magnetic member 18, forming a so-called magnetic fluid seal. This magnetic fluid seal is less deteriorated even if the rod 10 rotates several ten million rotations and provides highly durable sealing against the rotations of the rod 10. Further, the process gas that attempts to flow from the flow passage 30 to the outside of the butterfly valve 1 through the insertion through hole 8*d* is blocked from outflowing by the magnetic fluid seal. The butterfly valve configured as above can prevent the process gas from flowing to the outside of the butterfly valve 1 and thus prevent contamination of outside air while enhancing the durability of the seal. This can also prevent shortening of the operation life of the butterfly valve 1 and hence deteriorating of the semiconductor manufacturing efficiency.

The use of the magnetic fluid 19 may cause the following new issues. To hold the magnetic fluid 19 on the outer periphery of the rod 10, for example, it is conceivable to use the rod 10 made of magnetic stainless steel. However, the magnetic stainless steel is inferior in corrosion resistance to non-magnetic stainless steel. The rod 10 is a gas-exposed member which is inserted in the flow passage 30 and exposed to process gas. Thus, if the rod 10 is made of magnetic stainless steel, the rod 10 is likely to corrode by the process gas.

In the present disclosure, therefore, the rod 10 made of non-magnetic corrosion-resistant alloy (e.g., SUS316L) is used to prevent corrosion of the rod 10. Accordingly, the magnetic member 18 having a cylindrical shape to cover the outer peripheral surface of the rod 10 is used to hold the magnetic fluid 19.

(2) In the butterfly valve 1 described in (1), the valve unit 3 includes the inlet port 41 to allow the purge gas to flow in the valve unit 3, and the purge gas passage 44 configured to allow communication between the inlet port 41 and the insertion through hole 8*d*. The inlet port 41 and the flow passage 30 are communicated with each other through the purge gas passage 44 and the insertion through hole 8*d*. Accordingly, the purge gas inputted in the valve unit 3 through the inlet port 41 is outputted to the flow passage 30 through the purge gas passage 44 and the insertion through hole 8*d*. Since the purge gas flows from the insertion through hole 8*d* toward the flow passage 30, the process gas that attempts to enter the magnetic seal from the flow passage 30 via the insertion through hole 8*d* or flow out of the butterfly valve 1 is pushed back to the flow passage 30 by the purge gas. Thus, the butterfly valve 1 configured as above can reliably prevent the process gas from entering the magnetic seal or flowing out of the butterfly valve 1 and thus prevent contamination of outside air, and avoid shortening of the operation life of the butterfly valve 1 and deteriorating of the semiconductor manufacturing efficiency.

(3) In the butterfly valve 1 described in (2), the valve unit 3 includes the heaters 27A and 27B configured to heat the valve unit 3, the purge gas passage 44 is placed near the heater 27A and is provided with the heat exchanger 43. When heated by the heater 27A, the heat exchanger 43 is configured to heat the purge gas to a predetermined temperature. Accordingly, the butterfly valve 1 can prevent generation of particles due to solidification of components of the process gas.

Some of process gases used in a semiconductor manufacturing process are solid or liquid at room temperature and thus heated to a high-temperature gas state in use (e.g., heated to about 200°). The purge gas to be supplied through the inlet port 41 therefore has to be heated in advance before being outputted to the flow passage 30. This is because, if the purge gas remaining low in temperature is outputted to the flow passage 30 and comes into contact with the process gas, the temperature of the process gas is decreased, so that the process gas becomes solidified or liquefied. Consequently, a product such as the solidified process gas may be accumulated on the flow passage 30 or the pipe 34. To prevent such a defect, it is conceivable to heat purge gas in advance outside the butterfly valve 1 and then supply the heated purge gas to the butterfly valve 1. However, it is undesirable because this heating operation needs addition of a separate heating device to the semiconductor manufacturing device incorporating the butterfly valve 1. In the present embodiment, therefore, the valve unit 3 is configured to include the heaters 27A and 27B, the purge gas passage 44 near the heater 27A, and the heat exchanger 43. This configuration can heat the purge gas while passing through the purge gas passage 44 to a predetermined temperature through the utilization of the heat of the heater 27A. The thus configured butterfly valve 1 can prevent solidifying or liquefying of process gas and avoid a product such as solidified process gas from accumulating on the flow passage 30 and the pipe 34.

(4) In the butterfly valve 1 described in any one of (1) to (3), the rod 10 is provided, on the outer peripheral surface facing the inner peripheral surface of the insertion through hole 8d (i.e., the inner peripheral surface 20a of the bush 20), with the plurality of recesses 10a to 10e arranged in the axial direction of the rod 10, and the inner peripheral surface of the insertion through hole 8d (the inner peripheral surface 20a of the bush 20) and the plurality of recesses 10a to 10e form the labyrinth seal 50. Accordingly, the butterfly valve 1 can prevent breakage of the magnetic fluid seal due to a drastic pressure change in the vacuum chamber 32.

For example, if an operator erroneously operates the vacuum pump 33, causing the pressure in the vacuum chamber 32 to drastically decrease, a negative pressure is abruptly generated in the flow passage 30. Such an abrupt negative pressure generated in the flow passage 30 causes the gas to be steeply sucked from the drive unit 2 into the flow passage 30, resulting in a drastic drop of the pressure in the drive unit 2. Although the magnetic fluid 19 is held by the magnetic force of the magnetic member 18, if the pressure in the drive unit 2 drastically lowers, excessive pressure shock is imparted on the magnetic fluid 19, which may break the magnetic fluid seal, making the magnetic fluid seal fail to function. If the magnetic fluid seal is broken, it may be impossible to prevent the process gas from entering the drive unit 2. To prevent those defects, the butterfly valve 1 in the present embodiment is configured such that the rod 10 includes the plurality of recesses 10a to 10e arranged on the outer peripheral surface facing the inner peripheral surface of the insertion through hole 8d (i.e., the inner peripheral surface 20a of the bush 20) in the axial direction of the rod 10, and the inner peripheral surface of the insertion through hole 8d (the inner peripheral surface 20a of the bush 20) and the recesses 10a to 10e form the labyrinth seal 50. Accordingly, even if a negative pressure abruptly occurs in the flow passage 30, the labyrinth seal 50 operates to reduce the amount of gas to be sucked from the drive unit 2 to the flow passage 30. Thus, the pressure in the drive unit 2 does not drastically lower and the pressure shock to be imparted on the magnetic fluid 19 is reduced. This can prevent breakage of the magnetic fluid seal.

(5) The butterfly valve 1 described in (4) further includes the buffer space 51 between the magnetic fluid 19 and the labyrinth seal 50. Accordingly, even if a drastic pressure drop occurs in the flow passage 30, the amount of gas to be sucked from the drive unit 2 is larger by the buffer space 51 than in the configuration not including the buffer space 51. The butterfly valve 1 configured as above can reliably reduce the pressure shock to be imparted on the magnetic fluid 19 and also prevent breakage of the magnetic fluid seal.

The foregoing embodiments are mere examples and give no limitation to the present disclosure. The present disclosure may be embodied in other specific forms without departing from the essential characteristics thereof. For instance, in the foregoing embodiment, even when the butterfly valve element 9 is in the fully-closed position, the flow passage 30 is not completely sealed. As an alternative, a valve seat may be provided to the valve hole 8a so that the butterfly valve element 9 contacts with the valve seat to completely seal the flow passage.

REFERENCE SIGNS LIST

1 Butterfly valve
2 Drive unit
3 Valve unit
8d Insertion through hole
9 Butterfly valve element
10 Rod
11 DD motor (one example of a motor)
16a Hollow part
18 Magnetic member
19 Magnetic fluid
30 Flow passage
32 Vacuum chamber
33 Vacuum pump
34 Pipe

What is claimed is:

1. A butterfly valve to be placed on a pipe connecting a vacuum chamber and a vacuum pump to control vacuum pressure in the vacuum chamber, the butterfly valve comprising:
 a drive unit provided with a motor;
 a valve unit connected to the drive unit and internally provided with a flow passage and a butterfly valve element; and
 a rod connected to the motor, the rod extending from the drive unit into the flow passage through an insertion through hole of the valve unit and being connected to the butterfly valve element,
 wherein the drive unit includes:
  an end portion connected to the valve unit;
  a hollow part between the motor and the end portion so that the rod is inserted through the hollow part;
  a cylindrical magnetic member placed in the hollow part so that the magnetic member is coaxial with the rod and covers an outer peripheral surface of the rod; and
  a magnetic fluid filled in a void between an outer peripheral surface of the magnetic member and an inner peripheral surface of the hollow part,
 the rod is made of non-magnetic corrosion-resistant alloy,
 the rod is provided, on the outer peripheral surface facing an inner peripheral surface of the insertion through hole, with a plurality of recesses arranged in an axial direction of the rod, and
 the inner peripheral surface of the insertion through hole and the plurality of recesses form a labyrinth seal.

2. The butterfly valve according to claim 1 further including a buffer space between the magnetic fluid and the labyrinth seal.

3. A butterfly valve to be placed on a pipe connecting a vacuum chamber and a vacuum pump to control vacuum pressure in the vacuum chamber, the butterfly valve comprising:
- a drive unit provided with a motor;
- a valve unit connected to the drive unit and internally provided with a flow passage and a butterfly valve element; and
- a rod connected to the motor, the rod extending from the drive unit into the flow passage through an insertion through hole of the valve unit and being connected to the butterfly valve element, wherein the drive unit includes:
- an end portion connected to the valve unit;
- a hollow part between the motor and the end portion so that the rod is inserted through the hollow part;
- a cylindrical magnetic member placed in the hollow part so that the magnetic member is coaxial with the rod and covers an outer peripheral surface of the rod; and
- a magnetic fluid filled in a void between an outer peripheral surface of the magnetic member and an inner peripheral surface of the hollow part, the rod is made of non-magnetic corrosion-resistant alloy,
the valve unit includes an inlet port configured to allow purge gas to flow in the valve unit, and a purge gas passage configured to allow communication between the inlet port and the insertion through hole, and
the inlet port and the flow passage are communicated with each other through the purge gas passage and the insertion through hole.

4. The butterfly valve according to claim 3, wherein
the rod is provided, on the outer peripheral surface facing an inner peripheral surface of the insertion through hole, with a plurality of recesses arranged in an axial direction of the rod, and
the inner peripheral surface of the insertion through hole and the plurality of recesses form a labyrinth seal.

5. The butterfly valve according to claim 4 further including a buffer space between the magnetic fluid and the labyrinth seal.

6. The butterfly valve according to claim 3, wherein
the valve unit includes a heater configured to heat the valve unit,
the purge gas passage is placed near the heater and is provided with a heat exchanger, and
when heated by the heater, the heat exchanger is configured to heat the purge gas to a predetermined temperature.

7. The butterfly valve according to claim 6, wherein
the rod is provided, on the outer peripheral surface facing an inner peripheral surface of the insertion through hole, with a plurality of recesses arranged in an axial direction of the rod, and
the inner peripheral surface of the insertion through hole and the plurality of recesses form a labyrinth seal.

8. The butterfly valve according to claim 7 further including a buffer space between the magnetic fluid and the labyrinth seal.

* * * * *